United States Patent
Tobin

(10) Patent No.: US 10,155,473 B2
(45) Date of Patent: Dec. 18, 2018

(54) REAR WINDOW SECURITY GRID AND LIGHT SYSTEM

(71) Applicant: Michael W. Tobin, St. Charles, MO (US)

(72) Inventor: Michael W. Tobin, St. Charles, MO (US)

( * ) Notice: Subject to any disclaimer, the term of this patent is extended or adjusted under 35 U.S.C. 154(b) by 0 days.

(21) Appl. No.: 15/681,179

(22) Filed: Aug. 18, 2017

(65) Prior Publication Data

US 2018/0050632 A1 Feb. 22, 2018

Related U.S. Application Data

(60) Provisional application No. 62/377,280, filed on Aug. 19, 2016.

(51) Int. Cl.
| | |
|---|---|
| F21V 11/00 | (2015.01) |
| F21V 21/00 | (2006.01) |
| F21V 29/00 | (2015.01) |
| B60Q 1/30 | (2006.01) |
| B60Q 1/26 | (2006.01) |
| B60Q 1/52 | (2006.01) |
| B60Q 1/46 | (2006.01) |
| B60Q 1/50 | (2006.01) |

(52) U.S. Cl.
CPC .............. *B60Q 1/30* (2013.01); *B60Q 1/268* (2013.01); *B60Q 1/302* (2013.01); *B60Q 1/46* (2013.01); *B60Q 1/50* (2013.01); *B60Q 1/52* (2013.01); *B60Q 2400/20* (2013.01)

(58) Field of Classification Search
USPC ........................................................ 362/543
See application file for complete search history.

(56) References Cited

U.S. PATENT DOCUMENTS

| | | | |
|---|---|---|---|
| 2007/0120756 A1* | 5/2007 | Ogino | H01Q 1/1271 343/713 |
| 2008/0028697 A1* | 2/2008 | Li | B32B 27/08 52/171.2 |
| 2010/0149783 A1* | 6/2010 | Takenaka | F21K 9/00 362/84 |

FOREIGN PATENT DOCUMENTS

GB 2327491 A * 1/1999 ............... F21Q 1/00

* cited by examiner

*Primary Examiner* — Tuyen K Vo
(74) *Attorney, Agent, or Firm* — Charles McCloskey

(57) ABSTRACT

A rear window security grid and light system has a frame, a grid within it, cross units forming the grid, and a left member and a right member in each cross unit. The grid has a primary cross unit centered upon the frame. Upon each left member and each right member, the invention has at least one light emitting diode, or LED. The LED operate from the power supply of a vehicle or a separate battery. The LED provide at least three patterns: left chevron, right chevron, and a letter X. Each left member has an upper portion and a lower portion and each right member has an upper portion and a lower portion with LED upon each portion. The controls allow for selection of the chevron's direction, interval speed to simulate motion, and operation of the letter X upon each cross unit.

11 Claims, 3 Drawing Sheets

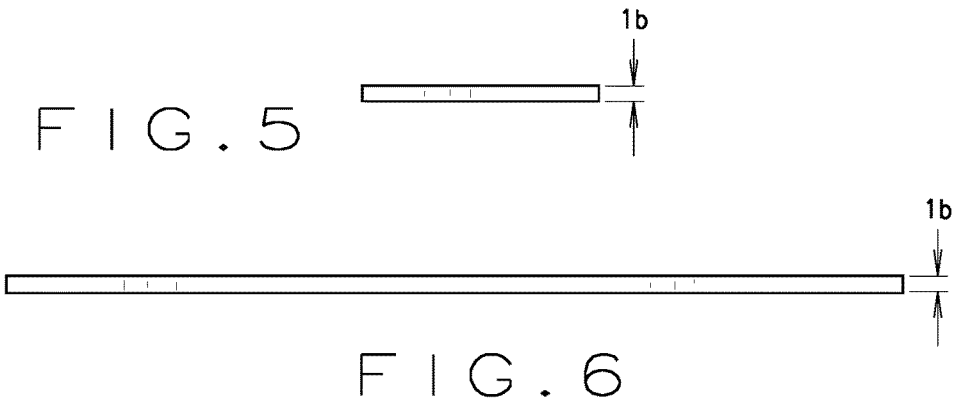
FIG.5
FIG.6
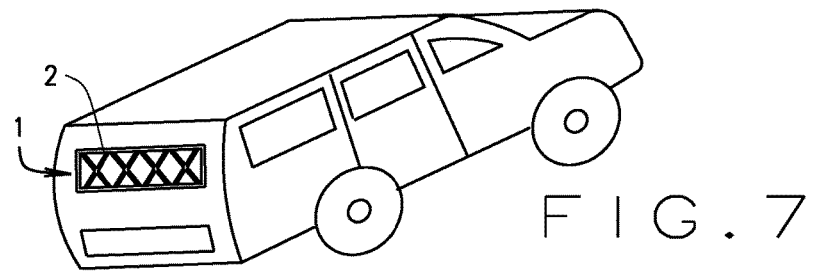
FIG.7
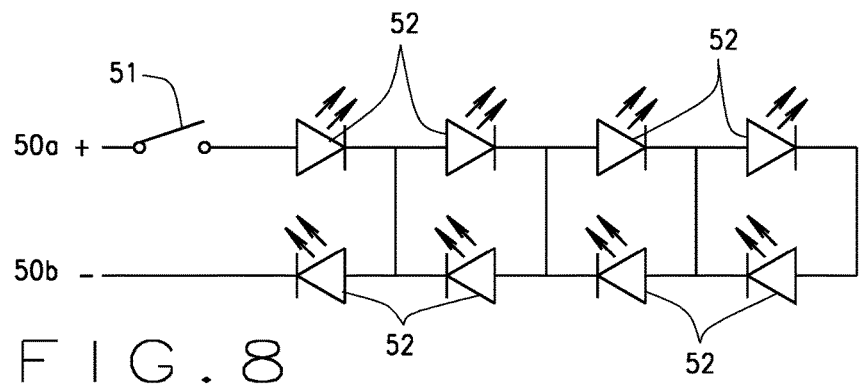
FIG.8
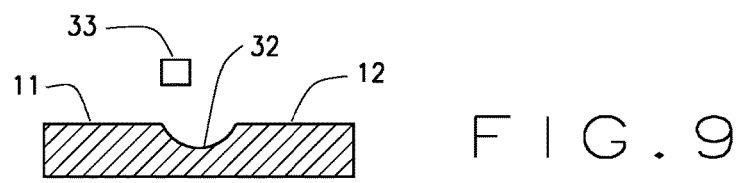
FIG.9

REAR WINDOW SECURITY GRID AND LIGHT SYSTEM

CROSS-REFERENCE TO RELATED APPLICATION

This non-provisional application claims priority to provisional application No. 62/377,280 filed on Aug. 19, 2016, all of which are owned by a common inventor.

BACKGROUND OF THE INVENTION

The rear window security grid and light system generally relates to law enforcement equipment and more specifically to pattern of bars with lights upon them that permits viewing through the bars and illumination behind a police vehicle. Though this description refers to police, the usage of police encompasses other agencies of various names in the law enforcement community.

For decades, police have patrolled their beats using automobiles. The automobiles bring an officer to a location on his beat quickly when a time of need arises, such as a crime in progress or other urgent situation. A police automobile travels at a high rate of speed when on official business, such as pursuit of a suspect, to reach a crime in progress, and the like. A fast police automobile presents a hazard to other motorists prohibited from travelling as fast as the police automobile. To warn other motorist, police automobiles have use sirens and lights. The sirens have a classic wailing sound known to motorists through watching media and hearing the occasional police automobile. A motorist hearing police sirens knows what to do and moves out of the way. Also to warn motorists, police automobiles have had lights upon them. In past decades, a police automobile would have an incandescent light in a rotating dome upon the roof of the police automobile. In more recent years, a police automobile has one of many light bars across its roof. Present day light bars utilize light emitting diode technology. The light bars generally flash blue, red, white, or a white, or a combination of them. Various state statutes regulate the deployment and operation of sirens and light bars upon police automobiles.

Police automobiles also transport the weapons and equipment of a police officer. From time to time, a police automobile also transports a prisoner. For many decades, police have used sedans as their automobiles. Sedans have the front windshield, door windows, and rear window as commonly seen on cars. A front windshield has the largest width and unobstructed view than the other windows. A front windshield allows the police officer driving the automobile to see the road ahead. The driver side front door window and passenger side front door window appear similar to their civilian counterparts. The driver side rear door window and the passenger side rear door window include reinforcement or safety glass features to prevent prisoners from breaking them. The rear window has a typical shape as the civilian counterpart but much less height than the front windshield. The rear window of an automobile in police use presents a low height generally less than the height of a gun case. A police officer may store a gun case in the trunk of a police automobile, or sedan, knowing that any breakage of a rear window or rear door window will not permit removal of a gun case from the trunk. Trunk storage keeps a gun case and other equipment out of sight and locked.

In the last fifteen to twenty years, police agencies have put more and more sport utility vehicles into their fleets and the number of sedans dwindles. A sport utility vehicle, or SUV, Ford® Explorer® for example, has a large rear window often as a component to a hatch. The rear window has a height nearly similar to the front windshield. The windows upon an SUV allow persons to see within it and provide poor concealment of contents. The windows upon an SUV have a large size that would allow passage of a gun case. An SUV lacks the security features in a sedan's trunk. Following Sep. 11, 2001 and more recent urban disturbances in the United States, police have deployed more gear, equipment, and weapons in their SUVs. In select urban disturbances, persons unknown have broken the rear windows of SUV and in a handful of incidents, such persons have taken police contents from the SUV. Also, in less publicized incidents, police officers have had rifles stolen from vehicles in their driveways, while out of a police SUV on calls, rendering assistance, taking reports, and other times the police vehicle is left unattended.

DESCRIPTION OF THE PRIOR ART

During recent years, police have sought to strengthen the rear window of their SUV. Police have had bars installed across the rear window generally horizontal, that is, parallel to the axles of the SUV. Each window typically requires a set of at least four bars. In select configurations, the existing bars extend through the center of the rear window and impede visibility for the police officer driving the SUV, typically during backing up or parking of the SUV. A dramatic increase has occurred in recent years in officer ambush shootings where officers have sat in their police vehicles only to fall victim to assassination. FCA through its Dodge brand has recently added a sonar alert system as an option to police Chargers to help prevent people approaching the rear of vehicle unnoticed. Select configurations of prior art bars also use wide flat bars that further obscure the driver's view out the rear window. In a handful of configurations, the bars still permit withdrawal of a slim gun case through them.

Police SUV, primarily the light bars upon their roofs, also serve to direct oncoming traffic and other traffic approaching a police vehicle from its rear. Existing light bars utilize flashing yellow lights that move from right to left or left to right as selected by the police officer. Some oncoming traffic sees those lights and changes lanes to avoid the stopped police SUV. Other traffic overlooks those lights and a few rear end collisions still happen between motorists and stopped police SUV. Other traffic does not see the thin line of moving yellow lights or does not comprehend the instruction to move to another lane of traffic. Existing directional technologies with its moving pattern of generic light, lamps or bulbs has a risk of being overlooked by traffic and of compromising officer safety.

Therefore, a need exists for a new and improved rear window security grid and light system that can be used for improving visibility through a rear window of an SUV while preventing withdrawal of a gun case through the rear window. In this regard, the present invention substantially fulfills this need. In this respect, the rear window security grid and light system according to the present invention substantially departs from the conventional concepts and designs of the prior art, and in doing so provides an apparatus primarily developed for the purpose of improving visibility through a rear window of an SUV, preventing withdrawal of a gun case, and providing signaling to oncoming motorists.

SUMMARY OF THE INVENTION

The present invention has a frame, nearly rectilinear in shape, a grid within the frame, at least four cross units forming the grid, and a left member and a right member forming each cross unit. The grid has a primary cross unit centered upon the frame. Upon each left member and each right member, the invention has at least one light emitting diode, or one LED, and the at least one LED upon the grid includes related wiring and controls. The invention may also have a series or a combination of LED modules on each section or leg, for example a 6" LED array or module for one half of a chevron. The at least one LED operate from the power supply of a vehicle or a separate battery. The at least one LED provide at least three patterns to an observer: left chevron, right chevron, and a letter X combining both chevrons. Each left member has an upper portion and a lower portion and each right member has an upper portion and a lower portion. A left chevron forms from LED upon the right member upper portion and the left member lower portion, a right chevron forms from LED upon the left member upper portion and the right member lower portion, the LED upon the left member and the right member of each cross unit for the letter X. The controls allow for selection of the chevron direction, interval speed of the chevron to simulate motion, and operation of the letter X upon each cross unit.

The present invention has a grid having a non-linear shape to eliminate blind spots caused by either vertical or horizontal bars or grids in the prior art. The prior art has vertical bars or grids that tend to block, hide and create blind spots for items including people standing, poles, trees, and the like. Horizontal bars or grids tend to block, hide and create blind spots for items like gates, fences, cables, parts of people, low obstacles, and the like. Reducing or eliminating blind spots serves a critical role for safety and lessening backing accidents involving police vehicles.

The present invention also provides a cooperating mounting surface for light emitting diode lights, or LED. The present invention places and positions the LED lights close to the rear glass of a rear window to reduce glare and bounce back of the LEDs. The present invention also has an asymmetric design that has specific engineering and shaping to maximize rear visibility. The mounting surface receives rear warning lights, or LEDs, and arranges them into right and left facing series of chevron shapes, that is, arrowheads. The chevrons illumination colors include many choices including red, blue, white and amber. Further, these chevron shapes can be illuminated to form steady "X" pattern in red or amber, for example to indicate a lane closed. The steady X pattern forms a cross unit as later described. Each cross unit of LED may also flash or blink. Adjacent cross units form a diamond pattern across the rear window as well. Further, the chevrons may have an interval sequence of right to left "arrow-like" chevrons where the chevrons appear to move to the side of the invention, and many other signal options.

Along with improving visibility through a rear window and signaling to oncoming traffic, the present invention also has a pattern of uniquely shaped openings, made by adjacent cross units, to retain critical items within the SUV and prevent them from fitting through the openings. In doing so, the shaped openings prevent persons unknown from removing critical items, for example weapons, from the vehicle upon breaking a rear window.

The present invention has its preferred installation in SUVs and pick-up trucks but may also function in many other vehicles and applications. The present invention has a near "universal", non-contoured design for vehicles with flat rear glass. In an alternate embodiment, the invention installs upon moderately curved rear window glass, having a radius of about 2 inches to about 3 inches from center to ends. In one embodiment, this invention utilizes a frame and insert version of a grid so that a GRID and LEDs may transfer from one vehicle to another. Other embodiments of the invention have designs specific to a model of vehicle, such as a Ford Interceptor police SUV or a Chevy Tahoe police pursuit vehicle, and these may have a curve or shape to fit a specific rear hatch window.

The present invention has its grid design, cross unit "X" size, and spacing capable of adjustment for proper position of the "X"s and their component LEDs in rear windows based on the specific vehicle of installation. The number of "X"s, chevrons, and their internangles in the present invention may vary from SUV to SUV because of the size and shape of the rear window in that model of vehicle and that particular vehicle.

And the present invention has its cross units and frame mounted inside the rear hatch window. This construction of the invention and its mounting allow a police officer to open of the rear hatch of a SUV for if desired without compromising the security provided by the grid system. The invention travels with the rear hatch during its opening and closing.

There has thus been outlined, rather broadly, the more important features of the invention in order that the detailed description thereof that follows may be better understood and that the present contribution to the art may be better appreciated. The invention also has its left members and right members passing each other at a crossing point that denotes the center of a cross unit, at least two secondary openings outwardly of the primary opening, at least two cross units, and holes upon the corners of the frame for mounting, and additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a rear window security grid and light system that fits within a frame of an existing police vehicle and provides signaling to vehicles approaching the police vehicle.

Another object is to provide such a rear window security grid and light system that allows a driver in the police vehicle to see through the grid.

Another object is to provide such a rear window security grid and light system that enhances visibility of a police vehicle resulting in an increase of officer safety.

Another object is to provide such a rear window security grid and light system that provides better rear visibility through a police vehicle's rear window and improved officer safety.

Another object is to provide such a rear window security grid and light system that improves the clarity of a typed message through its LED lighting, a signal, or message, to move to left, move to right, lane closed or warning.

Another object is to provide such a rear window security grid and light system that clarifies direction by illuminating the chevrons and the distinctive shape X displayed by the system.

Another object is to provide such a rear window security grid and light system made and distributed at a price suitable for purchase by law enforcement officers and various departments and agencies through retail stores, catalog supply houses, government contracting and procurement, and the like.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings,

FIG. 5 is a side view of the present invention;

FIG. 6 is a top view of the present invention;

FIG. 7 is a perspective view of the present invention deployed upon a police vehicle;

FIG. 8 is a circuit diagram for the present invention; and,

FIG. 9 is a sectional view of a member of the invention.

The same reference numerals refer to the same parts throughout the various figures.

DESCRIPTION OF THE PREFERRED EMBODIMENT

The present invention overcomes the prior art limitations by providing a rear window security grid and light system for improving visibility by a driver through the grid, signaling to motorists approaching a vehicle having the invention, and strengthening security of the rear window of a police vehicle. The term police vehicle includes sport utility vehicles, sedans, vans, and trucks.

Figure 1:
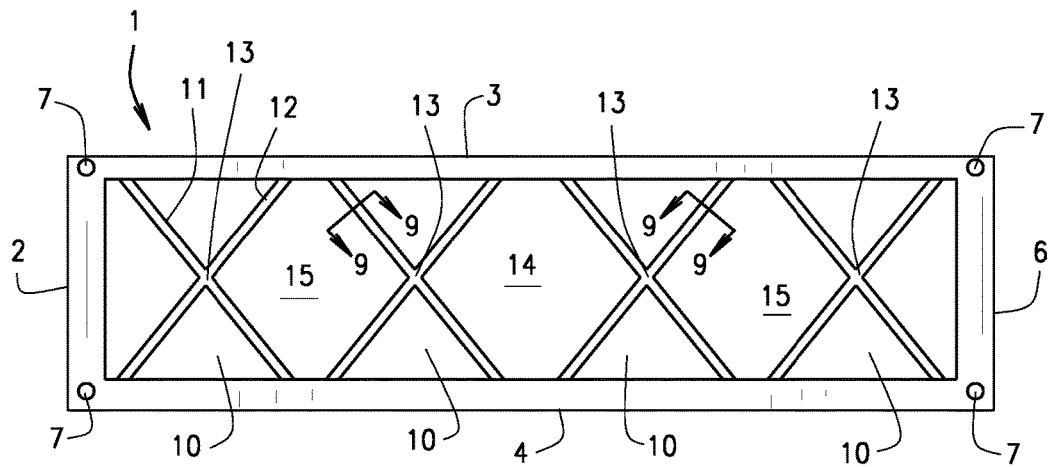
FIG. 1 is a top view of the present invention.

Though the drawings depict a system, the drawings do not have scale or an identified specific vehicle. The Applicant foresees that the system of the invention applies to sedans, SUV, pickup trucks, medium duty trucks, and other vehicles law enforcement may utilize. Further, the system of the invention may also apply to vehicles of other government agencies and commercial vehicles. The drawings represent the concept of the present invention and its design features. Turning to FIG. 1, the rear window security grid and light system of the present invention appears as frame 1 of a generally rectangular shape. The frame in this figure shows an outer surface 2 that a person may view from outside a police vehicle. The frame has an upper rail 3 and a mutually parallel and spaced apart lower rail 4. The upper rail 3 and the lower rail 4 extend longitudinally and provide a width to the invention, generally proportional to the width of a rear window in a police vehicle. The upper rail and the lower rail have a generally elongated, slender form. Each rail has two spaced apart ends. Spanning between the upper rail and the lower rail, the frame has a left end 5 and a mutually parallel and spaced apart right end 6. The left end and the right end have a generally perpendicular orientation to the upper rail and form the generally rectangular shape of the frame. Where the left end and the right end merge with the upper rail and the lower rail, the frame has corners and a hole 7 in each corner for mounting the invention 1 to the police vehicle. Further, the system also has alternate mountings through a variety of manners with a variety of mounting kits and sets of brackets suitable for various models of police vehicles and window configurations.

Within the frame 1 of the upper rail 3, the lower rail 4, the left end 5, and the right end 6, the invention has a grid 1*a* formed of at least two cross units 10. Each cross unit has a left member 11 and a right member 12 generally at an angle to each other from about seventy five degrees to about one hundred five degrees but at an angle to the upper rail, the lower rail, the left end and the right end from about thirty degrees to about fifty degrees. Preferably, each cross unit has its left member 11 and its right member 12 generally at a ninety degree angle to each other in a common plane similar to the plane of the frame and generally at a forty five degree angle to the upper rail, the lower rail, the left end and the right end. Preferably, each cross unit is symmetric. The cross units are mutually adjacent. In each cross unit, the left member and the right member approach each other and form a generally X like shape as shown. In each cross unit, the left member and the right member pass each other at a crossing point as at 13. In the preferred embodiment, a left member and a right member merge at the crossing point. In an alternate embodiment, a left member passes over a right member so that both members span continuously from the upper rail to the lower rail. The left members and the right members form a non-linear design and a diamond like shaped opening pattern. Each cross unit joins to the upper rail and the lower rail so that the cross unit remains fixed to the frame and forms a component of the grid 1*a*.

The present invention provides improved visibility through its system when installed upon a window of a police vehicle. The invention does this by positioning at least two cross units 10 within the frame 1 adjacent to each other. Two adjacent cross units have an opening between them. As shown in FIG. 1, the two cross units nearest the center of the frame have a primary opening 14 between them. Though a driver may see through a primary opening alone, the invention provides additional cross units 10 to span the width of a rear window of a police vehicle. The openings formed by cross units outwardly of the primary opening 14 serve as secondary openings 15. Each secondary opening may have a slightly different size, typically smaller then a primary opening. While the primary opening and the secondary opening promote visibility, these openings also have sizes that prevent a gun case from passing through them.

Figure 2:
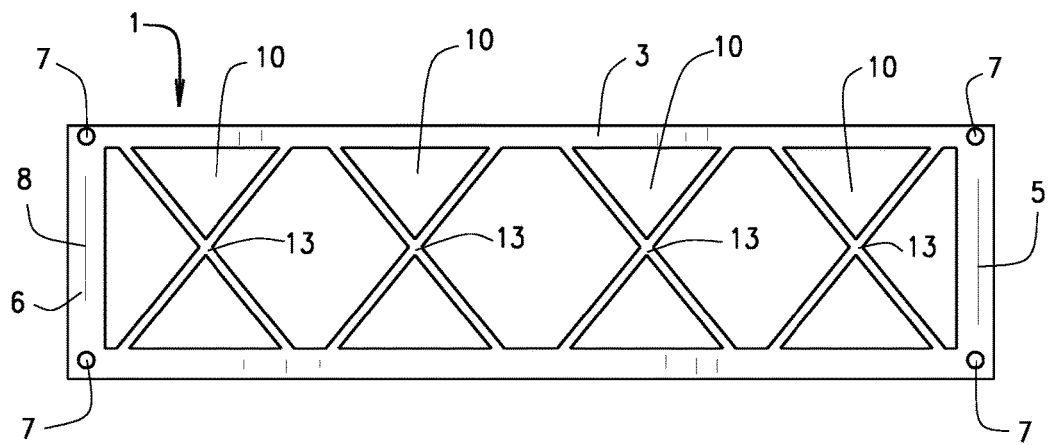
FIG. 2 is a bottom view of the present invention.

FIG. 2 shows the invention with its frame 1 turn over compared to FIG. 1. This figure has an inner surface 8 shown and an occupant of a police vehicle would see this surface following its installation. This figure shows the frame with the upper rail 3, lower rail 4, left end 5, and right end 6 as described above. The frame has its grid 1*a* formed of cross units 10, here shown as four, with the primary opening 14 and the secondary openings 15. In this view, the alternate embodiment of the cross units appears where the left members and the right members merge at the crossing points 13.

Figure 3:
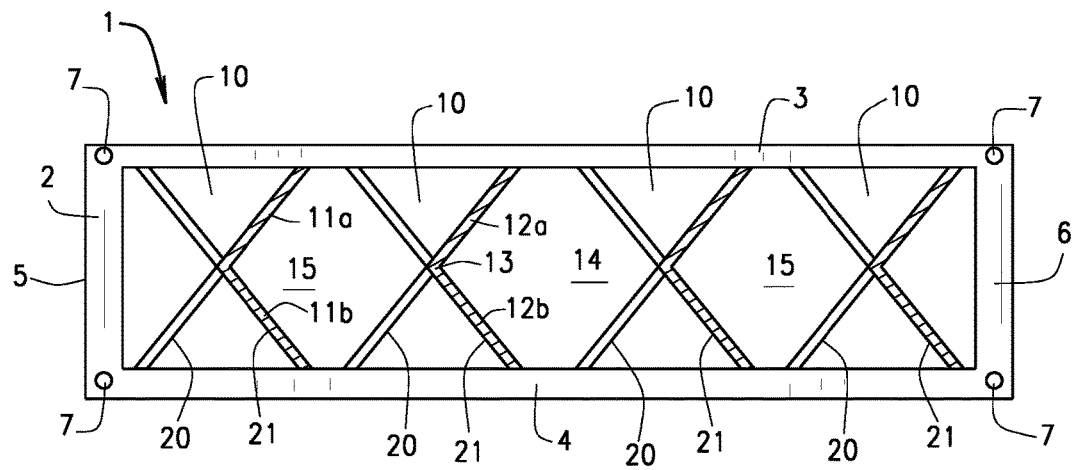
FIG. 3 is a top view showing chevrons within cross units of the present invention.

Similar to FIG. 1, FIG. 3 shows a front view of the invention with its frame 1 and outer surface 2 visible. The frame has its grid 1a as before within the upper rail, the lower rail, the left end, and the right end. The grid has a position outwardly from the center of the frame, that is, towards a vehicle window when installed. The grid forms from a plurality of cross units and each cross unit has its left member and its right member. More particularly, a left member extends from the upper left of a cross unit to the lower right, and a right member extends from the upper right of a cross unit back to the lower left. Above the crossing point, the left member has an upper portion 11a and the right member has an upper portion 12a. Below the crossing point, the left member has a lower portion 11b and the right member has a lower portion 12b. The left members and the right members combine into the cross units as shown. The cross units form into the grid 1a and the grid attaches to the frame 1 recessed inwardly from the outer surface 2. The cross units abut the undersides of the upper rail and the lower rail in this embodiment. The grid has a recessed position relative to the upper surface 2.

The grid has lighting upon it that may take various forms. Preferably, each cross unit has two chevrons of LED upon it, a left chevron 20 and a right chevron 21. Each left chevron joins to the left member upper portion 11a and the right member lower portion 12b. Each right chevron joins to the right member upper portion 12a and the left member lower portion 11b. The LED upon each left chevron and upon each right chevron emit the same color light subject to a controller, not shown. The LED have various configurations and here the chevrons have from three to six units across a chevron. Preferably, each chevron has an LED with four units across and a length of about four inches. In an alternate embodiment, the invention operates through a master control, or controller, in the police vehicle that an officer programs all of the LED operations via laptop computer. The master control is one of a means to communicate controls and commands into the LED for the desired visual effect. A master control receives programming through a laptop computer, not shown.

Each left chevron may illuminate at an interval subject to a controller and impart a sensation of a moving arrow to a viewing motorist. This figure shows the left chevrons 20 as dark and pointing to the right of this figure, and the right chevrons 21 as lighter and pointing to the left of the figure. The chevrons have their points shown upon the crossing points 13. By using LED upon the grid, the invention illuminates its chevrons suitable for viewing at a great distance from a police vehicle which provides plenty of time for a motorist to adjust travel of an oncoming vehicle. The invention follows lighting specifications SAE J845, J595, and CA Title XIII in its construction and operations.

The two chevrons in a cross unit may illuminate separately, as for indicating a left or a right arrow. The chevrons of a cross unit may also illuminate simultaneously and denote a letter X. Such a letter X generally denotes closure of a lane or to avoid a lane. Illuminating the chevrons of all cross units in the invention denotes with emphasis a lane being blocked. The chevrons may illuminate constantly, in a sequence, consecutively, blink, scroll, and the like. The chevrons in cooperation with the other components of the invention seek to provide a defined image to motorists who see the invention. A defined image appears as a chosen image or message that a motorist readily distinguishes from other visual information and clues in his field of vision. A defined image also minimized confusion in a motorist as the image has solely one meaning. A defined image though has distance and brightness that may oppose it. At great distances, the components of an image blend together. At short distances, portions of an image fall out of a motorist's field of vision. An overly bright image washes out shapes of numerals, letters, and symbols and blends into a bright light a motorist shies away from. An unduly dim image escapes a motorist's attention as other brighter objects appear in a motorist's field of vision. A defined image may also serve as a component of a pattern. To find a pattern, multiple defined images appear in a sequence. The present invention has its LED upon its chevrons with an appropriate brightness that maintains a defined image at a suitable distance for correct motorist action. The present invention also has preferably four cross units, equally spaced within the grid, so that a motorist may detect a pattern from variations in illumination of the chevrons of the invention.

Four cross units create an impression of motion and allow some time for a motorist's eye to acquire the image from the remainder of his visual field.

Figure 4:
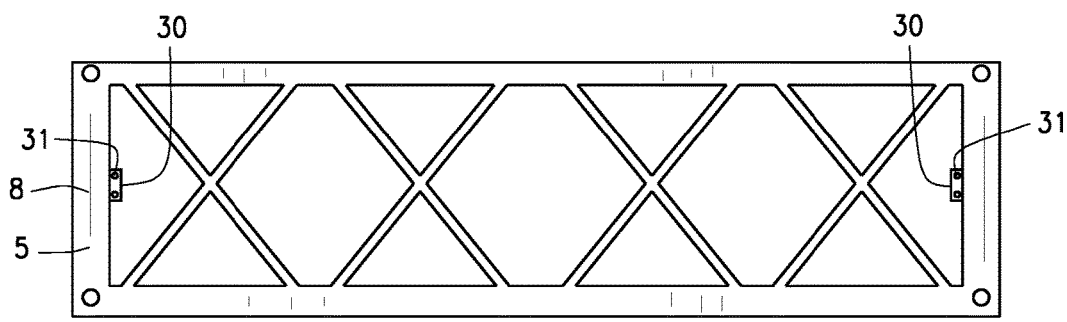
FIG. 4 is a bottom view of an alternate embodiment of the invention.

FIG. 4 then shows another alternate embodiment related to that shown in FIG. 3. The alternate embodiment has the frame 1 as before with the upper rail, the lower rail, the left end, the right end, the cross units, and the inner surface 2. The left end and the right end also include a tab 30 joined to them. Each tab extends inwardly from the left end and the right end, that is, into a cross unit. Each tab has at least one aperture 31 and each tab receives a high intensity emergency light, not shown. The tabs have a generally rectangular form as shown though the Applicant foresees alternate shapes for the tabs compatible with other lighting equipment. The tabs extend in a plane parallel to a plane defined by the frame.

Turning the invention once more, FIG. 5 shows a side view of it. Because the invention has partially symmetry, the left end 5 and the right end 6 appear similarly in this view. The invention has its frame 1 with a thickness 1b. In the preferred embodiment, the thickness conceals the grid 1a and LED lighting upon the left members and the right members.

Rotating the invention from that shown in FIG. 5, FIG. 6 shows a top view of it. With the partial symmetry of the invention, the upper rail 3, and the lower rail 4 appear similarly in this view. The frame 1 has its thickness 1b that conceals the grid and LED lighting within it.

As mentioned previously, the present invention installs upon the rear window of a police vehicle as shown in FIG. 7. The invention has its outer surface 2 shown to the left of the figure. The cross units appear in this figure though the left chevrons and the right chevrons remain dark.

The present invention includes a lighting component that operates with the circuitry shown in FIG. 8. The circuitry includes connections, 50a, 50b, to a vehicle power supply, a switch 51, and a plurality of LED 52. The LED have a parallel arrangement in this circuit so that failure of one LED does not prevent the other LED from illuminating. The invention typically operates upon 12VDC via an inline pc board. In an alternate embodiment, the invention operates upon a power connection to a vehicle's electrical system.

For select assembling of the invention, the members 11, 12 have a channel 32 thereon as shown in FIG. 9. The members have a generally rectangular cross section as shown and a lengthwise channel 32, that is, longitudinal, upon one surface of a member. The surface appears outwardly upon placement of the invention in a vehicle, as in FIGS. 1, 3, 7, that is, opening towards the outer surface 2. The channel has a depth into a member sufficient to receive the bottom or backing of an LED strip 33 and leave the light emitting portion of the LED visible. The LED strip may install into the channel in a friction fit, by adhesive, by riveting, and the like. The channel may have a rectangular cross section, a rounded cross section, a dovetail cross section, and the like.

From the aforementioned description, a rear window security grid and light system has been described. The rear window security grid and light system is uniquely capable of a large center opening for a rear window while preventing passage of a gun case through that opening and illuminating chevrons to signal oncoming motorists. Further, the rear window security grid and light system may also have blinking, scrolling, sequenced, and combined illumination of the chevrons and other related features compatible with the structure and purpose of the invention as shown and described. The grid, its cross units, and their members may be stamped or cut from steel or alternatively molded from a rugged polymer. The rear window security grid and light system and its various components may be manufactured from many materials, including but not limited to, vinyl, polymers, such as nylon, polypropylene, polyvinyl chloride, high density polyethylene, polypropylene, aluminum, ferrous and non-ferrous metals, their alloys, and composites.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A rear window security and light system, comprising:
a frame, a grid within the frame, said grid having at least one opening in a diamond like shape, said grid having a position upon said frame outwardly from a center of said frame;
a plurality of lighting upon said grid, a means to communicate controlling said lighting, and a power supply connection for said lighting;
said frame having an upper rail and a mutually parallel and spaced apart lower rail, a left end and a mutually parallel and spaced apart right end, said left end and said right end being generally perpendicular to said upper rail and said lower rail;
said grid having at least two mutually adjacent cross units;
each cross unit having a left member and a right member mutually passing upon a crossing point, said crossing point being generally centered in said cross unit, said left member and said right member forming a generally X shape wherein said left member has an angle to said upper rail from about thirty five degrees to about fifty degrees, and said right member has an angle to said upper rail from about thirty five degrees to about fifty degrees and a mirror image to said left member;
each left member having an upper portion and a lower portion;
each right member having an upper portion and a lower portion;
each cross unit having a left chevron of said left member upper portion and said right member lower portion and a right chevron of said right member upper portion and said left member lower portion;
said communication means including a controller;
said plurality of lighting including light emitting diodes led placed upon said left chevron of each cross unit and upon said right chevron of each cross unit; and,
wherein said controller operates the light emitting diodes upon said left chevrons as a unit and the light emitting diodes upon said right chevrons as a unit.

2. The rear window security and light system of claim 1 wherein said means to communicate controls the light emitting diodes upon said left chevrons as one of simultaneously, sequentially, consecutively, and scrolling and operates the light emitting diodes upon said right chevrons as one of simultaneously, sequentially, consecutively, and scrolling.

3. The rear window security and light system of claim 1 wherein said means to communicate controls the light emitting diodes upon said cross units so that said left chevrons and said right chevrons cooperate for one simultaneous, sequential, consecutive, and scroll display of an image there on.

4. A rear window security and light system, comprising:
a frame, a grid within the frame, said grid having at least one opening in a diamond like shape, said grid having a position upon said frame outwardly from a center of said frame; and,
a plurality of lighting upon said grid, a means to communicate controlling said lighting, and a power supply connection for said lighting;
said frame having an upper rail and a mutually parallel and spaced apart lower rail, a left end and a mutually parallel and spaced apart right end, said left end and said right end being generally perpendicular to said upper rail and said lower rail;

said grid having at least two mutually adjacent cross units;
each cross unit having a left member and a right member mutually passing upon a crossing point, said crossing point being generally centered in said cross unit, said left member and said right member forming a generally X shape wherein said left member has an angle to said upper rail from about thirty five degrees to about fifty degrees, and said right member has an angle to said upper rail from about thirty five degrees to about fifty degrees and a mirror image to said left member;
each left member having an upper portion and a lower portion;
each right member having an upper portion and a lower portion;
each cross unit having a left chevron of said left member upper portion and said right member lower portion and a right chevron of said right member upper portion and said left member lower portion;
said communication means including a controller;
said plurality of lighting including light emitting diodes led placed upon said left chevron of each cross unit and upon said right chevron of each cross unit;
wherein said controller operates the light emitting diodes upon said left chevrons as a unit and the light emitting diodes upon said right chevrons as a unit; and,
a tab upon said left end and a tab upon said right end, each of said tabs is adapted to receive equipment.

5. The rear window security and light system of claim 4, further comprising:
said left member has an angle to said upper rail of about forty five degrees and said right member has an angle to said upper rail of about forty five degrees.

6. The rear window security and light system of claim 4, further comprising:
four of said cross units equally spaced within said grid; and,
each of said cross units being symmetric.

7. The rear window security and light system of claim 6, further comprising:
said frame having an outer surface and an opposite inner surface, said outer surface adapted to install towards a window of a vehicle; and,
said grid having a position proximate said inner surface wherein said lighting has a recessed position within said frame.

8. The rear window security and light system of claim 4 wherein said means to communicate controls the light emitting diodes upon said cross units so that said left chevrons and said right chevrons cooperate for one simultaneous, sequential, consecutive, and scroll display of an image there on.

9. The rear window security and light system of claim 6, further comprising:
each left member having a longitudinal channel therein for receipt of said lighting; and,
each right member having a longitudinal channel therein for receipt of said lighting.

10. A device presenting a defined, distinguishable image to motorists comprising:
a plurality of lighting, a means to communicate controlling said lighting, and a power supply connection for said lighting;
said lighting illuminating cooperative chevrons suitable for one simultaneous, sequential, consecutive, and scroll display of an image;
said lighting locating upon a frame, said frame having a grid within the frame, said grid having at least one opening in a diamond like shape and at least two cross units positioned mutually adjacent, said frame having an upper rail and a mutually parallel and spaced apart lower rail, a left end and a mutually parallel and spaced apart right end, said left end and said right end being generally perpendicular to said upper rail and said lower rail;
each cross unit having a left member and a right member mutually passing upon a crossing point, said crossing point being generally centered in said cross unit, said left member and said right member forming an X shape wherein said left member has an angle to said upper rail from about thirty five degrees to about fifty degrees, and said right member has an angle to said upper rail from about thirty five degrees to about fifty degrees and a mirror image to said left member;
each left member having an upper portion and a lower portion;
each right member having an upper portion and a lower portion;
each cross unit having a left chevron of said left member upper portion and said right member lower portion and a right chevron of said right member upper portion and said left member lower portion;
said communication means including a controller; and,
said plurality of lighting including light emitting diodes led placed upon said left chevron of each cross unit and upon said right chevron of each cross unit, wherein said controller operates the light emitting diodes upon said left chevrons as a unit and the light emitting diodes upon said right chevrons as a unit.

11. The device presenting a defined, distinguishable image to motorists of claim 10 further comprising:
four of said cross units equally spaced within said grid;
each of said left members having an angle to said upper rail of about forty five degrees and each of said right member having an angle to said upper rail of about forty five degrees;
wherein each cross unit is symmetric; and,
a tab upon said left end and a tab upon said right end, each of said tabs is adapted to receive equipment.

* * * * *